UNITED STATES PATENT OFFICE.

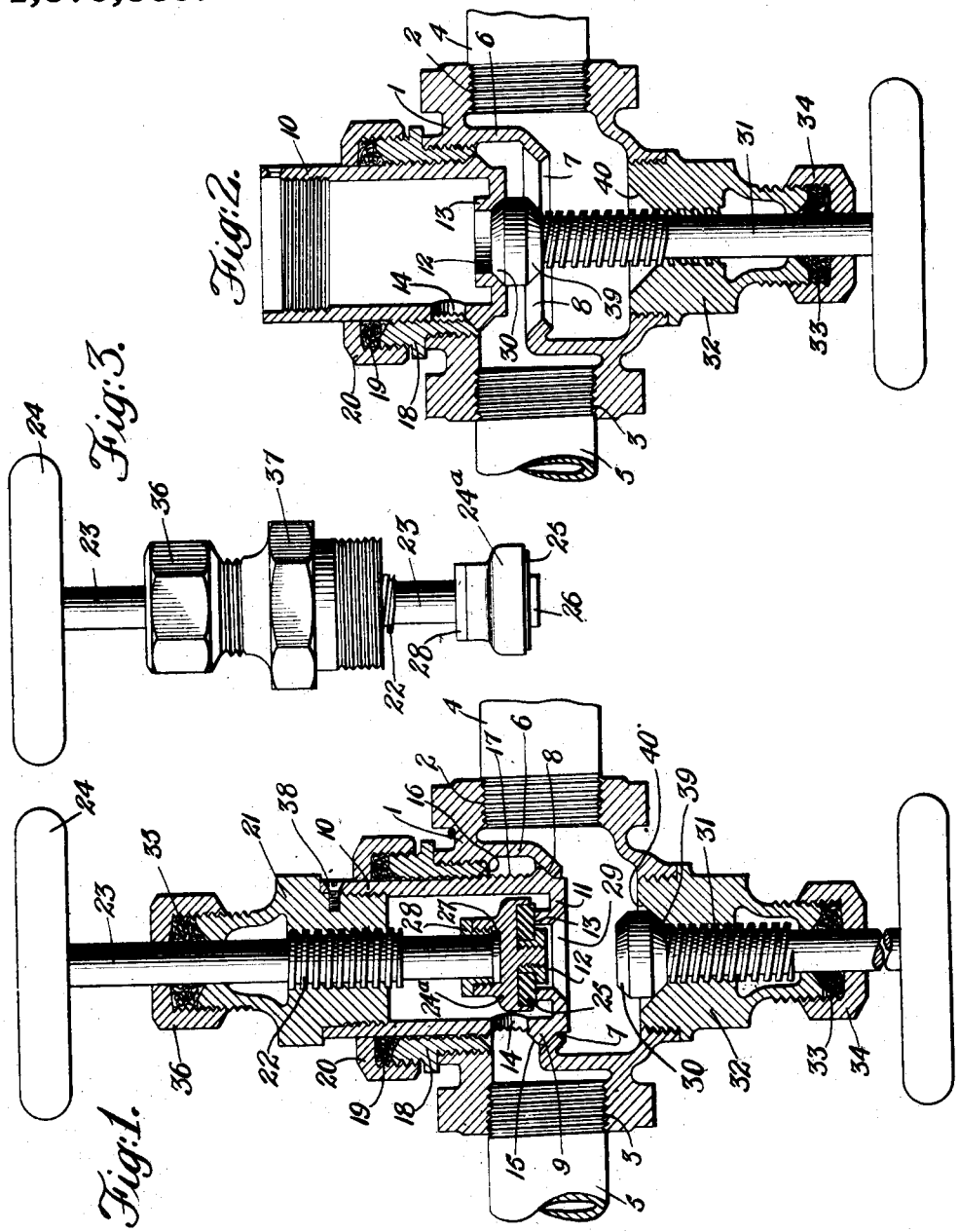

WILLIAM B. BRASSINGTON, OF PORT RICHMOND, NEW YORK.

VALVE.

1,379,389. Specification of Letters Patent. Patented May 24, 1921.

Application filed February 13, 1920. Serial No. 358,508.

*To all whom it may concern:*

Be it known that I, WILLIAM B. BRASSINGTON, a citizen of the United States, residing at Port Richmond, in the county of Richmond and State of New York, have invented certain new and useful Improvements in Valves; and I do hereby declare the following to be a full, clear, and exact description of the invention, such as will enable others skilled in the art to which it appertains to make and use the same.

My invention consists in the novel features hereinafter described, reference being had to the accompanying drawing which illustrates one embodiment of the invention, selected by me for purposes of illustration, and the said invention is fully disclosed in the following description and claims.

Valves used in pipe lines for steam and other fluids, or liquids, frequently become leaky, due to the wear of or imperfections in the packing around the valve stem, and it often happens, also, that injury to the valve or its seat occurs, and in many instances it is difficult, if not impossible, to effect any repairs to a leaky valve without shutting down the plant or a portion thereof, or otherwise seriously interfering for a considerable period with the operation of the pipe line. Hence in many instances valves are permitted to leak and waste the steam or other fluid or liquid passing through the pipe line on account of the difficulty of effecting repairs to the valve.

The object of my invention is to provide a valve which can be quickly and easily taken apart for the purpose of effecting repairs to the stuffing boxes, to the valve seat, or to the valve itself without allowing of the escape of any of the fluid or liquid passing through the pipe line and valve, and which can also be repaired without interrupting the continuous flow of liquid under pressure or otherwise through the pipe line and valve, while the actual repairs are being made.

In carrying out my invention, I preferably employ a longitudinally movable sleeve extending into the valve casing and adapted to close the communicating aperture in the partition between the inlet and outlet openings of the valve, the said sleeve being provided with a partition having an opening therein provided with a valve seat to receive the main valve which, with its stem, is carried by said sleeve, and I provide an independent auxiliary valve so constructed and arranged that it may be brought into action for the purpose of closing the aperture in the partition of said sleeve, to permit of the removal of the valve stem and valve therefrom without allowing the escape of liquid from the valve casing, and the relation between the said sleeve and said auxiliary valve is such that the said opening in the valve sleeve partition can be closed by the auxiliary valve when the sleeve has been moved longitudinally, so as to withdraw it from the communicating opening in the casing partition, thus permitting the valve stem and valve to be removed from the sleeve, while at the same time permitting the passage of the fluid or liquid carried by the pipe line through the valve without interruption.

In the accompanying drawing,

Figure 1 represents a vertical sectional view of a valve embodying my invention, and selected by me for the purpose of illustrating the same, the sleeve being shown in its innermost position within the valve casing, the main valve being shown in closed position, and the auxiliary valve being shown in inoperative position.

Fig. 2 is a similar view showing the valve sleeve in its outermost or withdrawn position, the auxiliary valve in operative position to close the valve aperture of the sleeve, and the main valve with its stem and plug or bushing removed from the sleeve.

Fig. 3 represents the main valve with its stem and the plug for engaging the sleeve, detached.

In the accompanying drawings, 1 represents the valve casing provided with inlet and outlet apertures, as 2 and 3, threaded to receive pipe sections or nipples 4, 5, the casing being provided with a partition 6 interposed between the inlet and outlet apertures, and provided with a communicating aperture, indicated at 7. The partition is also preferably provided with an inclined seat 8 to engage an exterior annular valve member 9 on a longitudinally movable sleeve 10, which in its innermost position, as shown in Fig. 1, has its lower portion fitting and closing the aperture 7 in the partition 6. The valve sleeve 10 is provided with a transverse partition 11 at its lower end, and has a central aperture 12 formed therein, which serves, during the normal operation of the valve, as a communicating aperture for the valve, and is surrounded by an annular seat 13 engaged by the main valve, as hereinafter described. The sleeve 10 is also provided with a lateral aperture 14 communicating with the outlet aperture 3 of the valve casing, and with the interior of the sleeve, and with the aperture 12 when the main valve is open, as will be readily understood. The valve sleeve is also provided with an inclined annular valve portion 15 on its exterior above the valve portion 9, adapted to engage a valve seat 16 on a part connected with the casing (or formed integrally therewith) for making a tight joint when the valve sleeve is in a withdrawn position, as shown in the drawing. In order to provide for the movement of the valve sleeve a portion of the sleeve is threaded, as indicated at 17, and for convenience of assembling the parts, I prefer to provide the casing 1 on its upper side with an enlarged aperture, threaded to receive a bushing 18, the inner wall of which is threaded to engage the thread 17 on the sleeve, as clearly shown in the drawings. The use of this bushing enables me to insert the sleeve 10 more readily, by accommodating the annular valve portions 9 and 15, which are preferably of greater diameter than the threaded portions of the sleeve. In order to make a tight joint between the sleeve and bushing and casing, the upper end of the bushing is provided with a packing recess to receive packing 19, which is provided with the usual follower or gland 20, as shown.

The sleeve 10 is provided at its upper end with a plug 21 having a central aperture therein, provided with threads to engage a threaded portion 22 of the valve stem 23, which is provided at its upper end with a hand wheel 24, or other means for rotating it, and at its lower end is provided with a valve body 24ª capable of relative rotation with respect to the valve stem, and carrying the annular valve 25 which may be of fiber, rubber, soft metal, or other suitable material, and is capable of being removed and replaced when worn. The valve 25 is held in position in the metallic valve body 24ª by means of a shouldered sleeve 26 and the valve stem is provided with an annular flange at its lower end, indicated at 27, engaged by a shouldered sleeve 28, screwed into the upper end of the valve body, so as to cause the valve and valve body to rise and fall with the stem and to permit of relative rotation between the valve and stem to prevent undue wear of the valve and seat.

The central communicating aperture 12 in the bottom or transverse partition 11 of the sleeve is preferably provided with a tapering or conical valve seat, indicated at 29, which is adapted to be engaged by an auxiliary valve 30 mounted on a threaded valve stem 31 extending through a threaded aperture in a plug 32, screwed into a threaded aperture in the casing concentrically with the aperture 12. The plug 32 is provided with the usual packing 33 and follower or gland 34, to prevent leakage, and the main valve plug 21 is likewise provided with packing, indicated at 35, and a packing gland 36 for the same purpose. The plug 21 is conveniently provided with a hexagonal portion 37 (see Fig. 3) to facilitate the rotation of the sleeve and plug, and also of the plug with respect to the sleeve, when desired. I prefer to connect the plug 21 and the valve sleeve 10 in such a manner that they may be jointly rotated when desired for the purpose of moving the sleeve longitudinally, and I have shown, for example, the screw 38 extending through the sleeve 10 into the valve plug 21 (see Fig. 1) for this purpose.

Assuming the parts to be as shown in Fig. 1, it will be noted that the bottom or transverse partition 11 of the sleeve 10 closes the aperture 7 in the ordinary valve casing partition, so that the only passage afforded through the valve under normal conditions, is through the aperture 12 in the sleeve, which is closed by the main valve 25. When the main valve 25 is opened, the fluid or liquid can pass through the valve casing through the aperture 12 and the lateral aperture 14 in the wall of the sleeve 10. If it be desired to repair the main valve or its seat, or to repack the valve stem, and there is no objection to temporarily stopping the passage of fluid or liquid through the valve while the repairs are being made, the auxiliary valve 30 can be screwed in by turning the stem 31 until the auxiliary valve engages the valve seat 29 around the opening 12 in the sleeve, thus closing said opening after which the screw 38 can be removed and the plug 21 rotated with respect to the sleeve 10, so as to remove the valve and valve stem completely, giving an opportunity to repack the valve stem, to renew the valve, and also to grind the valve seat 13 if that should be necessary.

If it is necessary to make repairs to the valve without interfering with the passage of fluid or liquid through the valve, as is very frequently the case, it is only necessary to first rotate the sleeve 10, as by applying a wrench to the portion 37 of the plug 21, thereby withdrawing the sleeve vertically in the casing to the position shown in Fig. 2, and bringing the valve portion 15 into engagement with the valve seat 16, in this instance carried by the bushing 18. This withdraws the lower end of the valve sleeve, from the aperture 7 in the partition 6, leaving that aperture entirely open for the free passage of fluid or liquid through the valve casing from the inlet opening to the outlet opening. The auxiliary valve 30 can now be screwed upwardly so as to bring it into engagement with the valve seat 29 surrounding the aperture 12 in the lower end of the valve sleeve, thereby cutting off all communication between the interior of the sleeve 10 and the interior of the valve casing. It is to be understood that the auxiliary valve 30 and its stem will of course be of smaller diameter than the aperture 7 in the partition 6, so that they do not materially obstruct this aperture, although they will extend through the same, as in Fig. 2, when used in this manner. The parts being in this position, indicated in Fig. 2, the screw 38 can be removed and the plug 21 unscrewed, so as to withdraw the main valve and its stem, and facilitating the making of repairs to the packing of the stem, to the valve, or to the valve seat, as before described. The repairs having been made, the main valve can be replaced and screwed down to its normal position, after which the main valve can be opened.

While it is perhaps unnecessary, I prefer to provide the auxiliary valve 30 with a beveled portion, indicated at 39 on the under side thereof, to engage an inclined valve seat 40 surrounding the aperture in the plug 32, through which the valve stem passes, for the purpose of making a tight joint at this point, when the auxiliary valve is in its inoperative position. This protects the screw threads by preventing the leakage past them, and is desirable but not essential. My improved valve therefore provides means whereby it may be repaired and kept at all times tight and efficient, and will be found particularly advantageous and desirable for use in pipe lines transmitting steam and other gaseous materials under pressure, especially explosive and noxious gases, such as ammonia, etc., and for all other pipe lines in which its use may be desired in the preventing of leakage and waste and insuring the efficient operation of the valve.

What I claim and desire to secure by Letters Patent is:—

1. The combination with a valve casing provided with inlet and outlet apertures, and a partition provided with a communicating aperture, of a longitudinally movable sleeve extending into said casing, and having a part fitting in said aperture, said sleeve being provided with a transverse wall having an aperture therein surrounded by a valve seat, and being provided with an aperture forming a communication between the interior of the sleeve and interior of said casing, of a main valve carried by said sleeve for engaging said valve seat, and a normally open auxiliary valve independent of said sleeve movable longitudinally into and out of engagement with the aperture in said sleeve, which is closed by the main valve.

2. The combination with a valve casing provided with inlet and outlet apertures, and a partition provided with a communicating aperture, of a longitudinally movable sleeve extending into said casing, and having a portion fitting said communicating aperture, said sleeve being provided with a transverse partitition provided with an aperture leading to the interior of said sleeve, said sleeve being also provided with an aperture communicating with the interior of the casing, a main valve carried by said sleeve for closing the first named aperture of said sleeve, a separate auxiliary valve within the casing movable longitudinally of its axis into and out of position to close the aperture closed by said main valve, and capable of passing through said communicating aperture in said partition and means extending from said auxiliary valve to the exterior of the valve casing, for operating said auxiliary valve independently of the sleeve and said main valve.

3. The combination with a valve casing provided with inlet and outlet apertures, and a partition provided with a communicating aperture, and a valve seat surrounding the same, of a longitudinally movable sleeve extending into said casing, and provided with a valve portion fitting said seat, said sleeve being provided with a transverse wall having an aperture communicating with the interior of the sleeve and having a lateral aperture communicating with the interior of the casing, a main valve for closing the aperture in the transverse wall of the sleeve, a valve stem carried by said sleeve for operating the main valve, a separate auxiliary valve for closing the aperture in the sleeve, which is closed by the main valve, said auxiliary valve being provided with a stem mounted in the valve casing, and movable longitudinally therein.

4. The combination with a valve casing provided with inlet and outlet apertures, and a partition provided with a communicating aperture, of a longitudinally movable sleeve extending into said casing and having its lower end fitting said aperture in said partition to form a tight joint, said sleeve being provided with an aperture in its lower end communicating with the interior of the sleeve, and a lateral aperture communicating with the interior of the valve casing, the portion of the valve casing through which said sleeve extends being provided with a valve seat, a valve portion on said sleeve for engaging said seat when the valve sleeve is in its withdrawn position, an auxiliary valve mounted on a valve stem extending through the valve casing, and capable of longitudinal movement therein, said auxiliary valve being movable toward and from the end of the sleeve, for closing and opening the aperture therein, and a main valve and valve stem carried by said sleeve for controlling said opening.

5. The combination with a valve casing provided with inlet and outlet apertures, and a partition within said casing provided with a communicating aperture, of a longitudinally movable sleeve extending into said casing and normally fitting said partition aperture but capable of being withdrawn therefrom without disconnecting it from the casing, said sleeve casing being provided with inlet and outlet apertures providing a passage through the sleeve from the inlet aperture of the casing to the outlet aperture thereof, a main valve carried by said sleeve for closing one of said sleeve apertures, and an auxiliary valve carried by the casing for closing said sleeve aperture when the valve sleeve is in both normal and withdrawn position.

6. The combination with a valve casing provided with inlet and outlet apertures, and a partition having a communicating aperture therein, said valve casing having apertures on opposite sides, concentric with said communicating aperture, a longitudinally movable sleeve engaging one of said concentric apertures and having its lower end engaging the said communicating aperture, said sleeve being provided with inlet and outlet apertures, providing a passage through the sleeve from the inlet aperture of the casing to the outlet aperture thereof, a main valve within said sleeve for closing one of said sleeve apertures, a valve stem carried by the sleeve for operating said main valve, means for withdrawing said sleeve longitudinally from engagement with the partition aperture, and an auxiliary valve mounted in the opposed concentric aperture of the casing and movable longitudinally to close the aperture in the valve sleeve closed by the main valve.

7. The combination with a valve casing provided with inlet and outlet apertures, a partition and a communicating aperture therein, of a longitudinally movable sleeve extending into said casing, and fitting in said communicating aperture, said sleeve being provided with an aperture in its inner end having a valve seat surrounding the same, and having a lateral aperture establishing communication between the interior of the sleeve and casing, a valve within said sleeve for engaging said valve seat, a longitudinally movable valve stem for said valve carried by the sleeve, an auxiliary valve independently mounted in the casing and movable toward and from the end of the sleeve to close the aperture therein.

In testimony whereof I affix my signature.

WILLIAM B. BRASSINGTON.